UNITED STATES PATENT OFFICE.

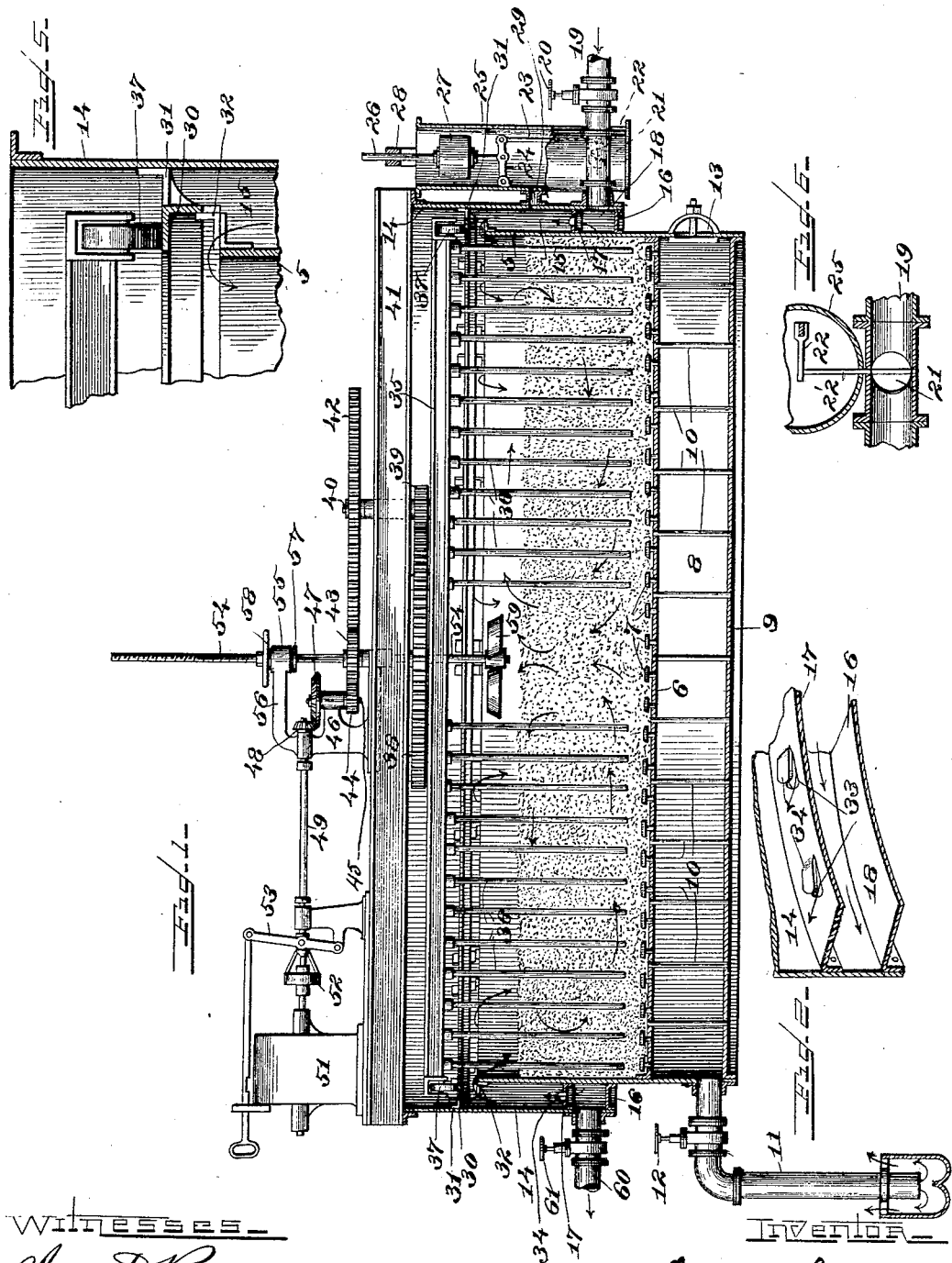

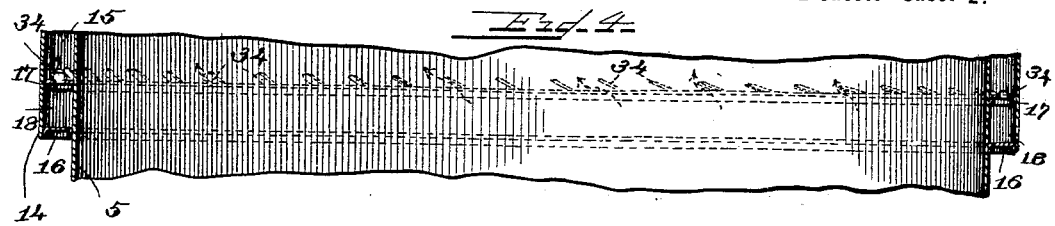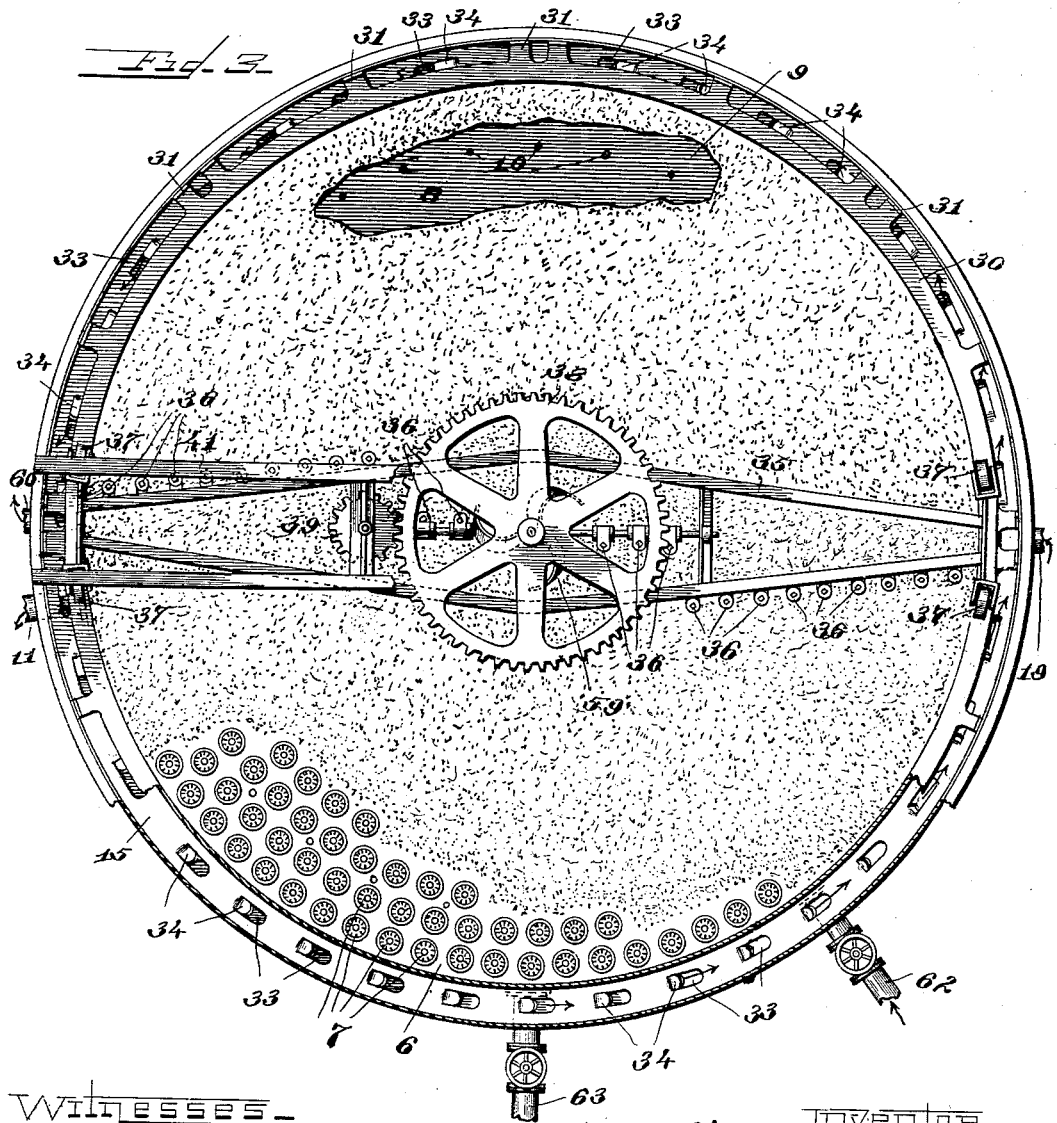

OMAR H. JEWELL, OF CHICAGO, ILLINOIS.

FILTER.

SPECIFICATION forming part of Letters Patent No. 653,737, dated July 17, 1900.

Application filed January 29, 1900. Serial No. 3,150. (No model.)

*To all whom it may concern:*

Be it known that I, OMAR H. JEWELL, a citizen of the United States, residing at Chicago, in the county of Cook and State of Illinois, have invented certain new and useful Improvements in Filters, of which the following is a specification, reference being had to the accompanying drawings.

My invention relates to filters employing a bed of granular material for removing impurities from the water treated and has special reference to filters of the gravity type. Heretofore such filters have been limited in size, owing principally to the difficulty of cleansing filter-beds of large area and also to the difficulty of securing uniform distribution of the impure water over the surface of the filter-bed, so that the different portions of the filter-bed should be uniformly utilized. The improvements which form the subject-matter of this application overcome the above-mentioned obstacles and make it possible to build filters of the kind mentioned several times greater in area and capacity than any heretofore made.

The invention resides in a novel construction of filter in general, in the manner of distributing the inflowing water, in the arrangements for the removal of the wash-water, and in the apparatus for cleaning the filter-bed itself.

In the accompanying drawings, Figure 1 is a vertical cross-section of a filter embodying my improvements. Fig. 2 is a detail, being a perspective view illustrating a part of the apparatus for admitting unfiltered water to the filter. Fig. 3 is a plan view of the filter, some parts being broken away. Fig. 4 is a sectional view illustrating the inlets for impure water. Fig. 5 is an enlarged detail illustrating the mounting of the agitator-frame. Fig. 6 is a horizontal sectional view showing the controlling mechanism; and Fig. 7 is a horizontal sectional view showing the impure-water inlet, some parts being broken away.

5 indicates a filter-tank which is adapted to contain the usual granular filter-bed, the average upper level of which is usually substantially as indicated in Fig. 1. The filter-bed rests on a false bottom 6 of the tank 5, which is provided with a large number of strainers 7, as shown in Figs. 1 and 3. Said strainers 7 communicate with a filtered-water chamber 8, formed by the false bottom 6 and the bottom 9 of the tank 5.

10 indicates a series of supporting-posts which hold the bottom 9 and the false bottom 6 properly spaced apart.

11 indicates a pure-water pipe which communicates with the filtered-water chamber 8, as shown in Fig. 1. Said pipe is controlled by a valve 12.

13 indicates a manhole-cover which covers a manhole in the bottom portion of the filter-tank 5, affording access to the chamber 8, as shown in Fig. 1.

14 indicates a cylinder or jacket arranged around the filter-tank 5, as shown in Figs. 1 and 3. The jacket 14 is of greater diameter than the filter-chamber, forming a chamber 15 between said jacket and the filter-chamber. The lower edge of the jacket 14 is arranged some distance above the false bottom 6, and its upper edge projects some distance above the upper edge of the filter-tank 5, as shown in Fig. 1. By placing the jacket 14 above the false bottom 6 it does not interfere with access to the filtered-water chamber 8, which may therefore be more readily cleaned, and, furthermore, the construction is simplified, in that it is not necessary in making connections with the pure-water chamber 8 to extend the pipe through said jacket. A further important advantage of this construction is that unfiltered water leaking from the chamber 15 cannot enter the filtered-water chamber 8, so that there is no danger of contamination of the filtered water.

16 indicates a horizontal annular plate which secures the lower edge of the jacket 14 to the filter-tank 5.

17 indicates a horizontal annular plate arranged in the chamber 15 some distance above the plate 16 and secured to the jacket and to the filter-tank, forming an annular chamber or conduit 18, as shown in Fig. 1.

19 indicates an impure-water pipe which communicates with the source of supply and with the conduit 18, as shown in Figs. 1 and 7. The pipe 19 is provided with a shut-off valve 20 and with a butterfly-valve 21, which is adapted to be automatically adjusted to control the flow of water into the filter-tank. For this purpose the butterfly-valve is provided with an arm 22, which is connected to its pivot 22' and is arranged outside the pipe 19, as shown in Fig. 6, said arm being connected by a rod 23 to a pivoted lever 24, which is pivoted in a vertically-arranged reservoir 25, as shown in Fig. 1. The lever 24 is in turn connected by a vertical rod 26 to a float 27 in the reservoir 25. The upper end of the rod 26 runs through a guide 28, as shown. The reservoir 25 is arranged parallel with the filter-tank 5, its upper end rising to about the level of the upper edge of the jacket. An opening 29 is provided between the chamber 15 and the reservoir 25 to admit the water from said chamber to said reservoir. By this construction as the water rises in the filter-tank and in the chamber 15 it also rises in the reservoir 25 and raises the float 27, which automatically adjusts the butterfly-valve 21. The parts are adjusted so that when the water rises in the filter-tank above the proper level the butterfly-valve is adjusted to restrict or stop the flow into the tanks, whereas when the water in the filter-tank falls again the float 27 descends and opens the valve 21.

30 indicates an annular track which is secured slightly above the upper edge of the filter-tank 5 by brackets 31, which are secured to the jacket 14, and brackets 32, secured to the upper edge of the filter-tank, as shown in Figs. 1 and 5. The brackets 31 32 are so arranged as not to materially impede the flow of water from the chamber 15 around the track 30 into the filter-tank.

33 indicates a series of passages or openings provided in the plate 17 for admitting water from the chamber 18 to the chamber 15. Said openings are formed by making U-shaped cuts at suitable intervals in the plate 17, forming tongues 34, which are bent upward to a greater or less extent. Said openings 33 are placed at different points around the plate 17 and are proportioned in size or distance apart according to the area of the conduit 18 and the water-pressure in the same—that is to say, said openings are farther apart or are less in area near the inlet-pipe 19 than at the opposite end of said conduit 18, the amount of variation depending on the friction of the water in said conduit. This arrangement of the openings is shown in Figs. 3, 4, and 7. For example, if one-half the original head is lost at the extreme end of the conduit 18 the passages farthest from the inlet would be one-fourth as far apart as those near the inlet, or they would be of four times the area of those which received the water first. The area of said passages 33 may be varied readily by adjusting the position of the tongues 34, as illustrated in Fig. 4. The tongues 34 are all inclined in the same general direction, so that they serve to discharge the inflowing water into the chamber 15 tangentially, establishing circulatory currents in the filter, thereby promoting the agglomeration of the impurities and their retention in the filter-bed.

35 indicates a beam which carries a series of agitating-arms 36, arranged vertically, as shown in Fig. 1. Said beam 35 is provided with rollers 37 at its ends, which are adapted to run on the track 30, as shown in Figs. 1 and 3. The beam 35 is adapted to rotate about a vertical axis, the rollers 37 moving on the track 30, as above stated, such rotary movement carrying the agitators 36 around through the filter-bed and agitating it thoroughly. The agitators 36 are designed to agitate the outer portion of the bed and not the central portion thereof, a separate agitator being provided for the latter portion of the bed. The beam 35 is rotated by means of a series of gears, consisting of a gear-wheel 38, secured on the beam 35, said wheel being in mesh with a pinion 39, mounted on the vertical shaft 40, carried by stationary beams 41, mounted on the jacket 14, and extending across the filter-tank, as shown in Figs. 1 and 3. The shaft 40 carries at its upper end a gear-wheel 42, which meshes with a pinion 43, the latter meshing with a second pinion 44, mounted on a vertical shaft 45, which is supported in a suitable bearing in a bracket 46, as shown in Fig. 1. The shaft 45 carries a beveled gear 47, which meshes with a beveled pinion 48, mounted on a driving-shaft 49, which is suitably supported above the filter-tank by the bracket 46 and a bracket 50. The shaft 49 may be driven by a motor 51 or other suitable source of power and is provided with clutch mechanism 52, operated by a lever 53, by which it may be stopped and started at pleasure. As shown in Fig. 1, the pinion 43 is mounted on a feather on a vertically-arranged screw-threaded shaft 54, the upper end of which is supported in a suitable bearing 55, carried by an arm 56 of the bracket 46. The shaft 54 does not bear directly in the bearing 55, but passes through a sleeve 57, arranged in said bearing, as shown in Fig. 1, which sleeve is provided with suitable collars to hold it in place. Above the sleeve 55 is a screw-threaded hand-wheel 58, fitted on the screw-threaded upper portion of the shaft 54. By this construction by adjusting the hand-wheel 58 the shaft 54 may be raised and lowered at pleasure; but when said hand-wheel is not adjusted said shaft will be free to rotate with the pinion 43 without vertical movement.

59 indicates an agitator carried at the lower end of the shaft 54 within the filter-tank 5. The agitator 59 is composed of a series of backwardly and outwardly curved blades arranged in an inclined position, as shown in Figs. 1 and 3, the inclination of said blades being such as to cause the material engaged by said agitator to rise when said agitator is rotated in the proper direction. By curving said blades backward and outward they act to throw the sand and water outward, causing circulatory currents, as indicated by the arrows, facilitating the purification of the bed. In the construction shown this is effected when the agitator is rotated, as indicated by the arrow in Fig. 3.

60 indicates an outlet-pipe for wash-water, which pipe communicates with the chamber 15 and is provided with a suitable valve 61, as shown in Fig. 1.

The operation of my improved apparatus is as follows: Water being admitted through pipe 19 to conduit 18 flows in said conduit around the filter-tank 5 and rises at various points around said filter-tank through openings 33 into the chamber 15, the rise of the water in the chamber 15 being substantially uniform, owing to the arrangement of the openings 33 in the manner described. At the same time the water is given a circulatory movement by reason of the arrangement of the tongues or deflectors 34. The water rising in the chamber 15 overflows the upper edge of the tank 5 and is distributed over the filter-bed substantially uniformly, thence passing down through the filter-bed to the strainers 7 and through them to the filtered-water chamber 8, and passes off through outlet-pipe 11. During the operation of the filter a substantially-uniform level is maintained in the filter-tank by the automatic regulation of the area of the inlet-passage by means of the float 27.

In order not to interfere with the circulatory movement of the water flowing from the chamber 15 to the filter-tank, the brackets 31 32 are angularly arranged to correspond with the direction of movement of the water.

When the filter-bed has become impure and washing is necessary, the valve 20 of the inlet-pipe 19 is closed and wash-water is admitted to the filtered-water chamber 8 through a pipe 62, as shown in Fig. 3. The wash-water rises through the strainers 7 to the filter-bed, through which it also rises, and finally overflows the filter-tank 5, passing into the chamber 15 and out through pipe 60. The valve 61 is opened for that purpose. While the washing is in progress, the filter-bed is agitated not only by the upwardly-moving water, but also by the agitator-arms 36 and the agitator 59, which are rotated for that purpose. It will be noted that the outer portions of the filter-bed are agitated by the arms 36, whereas that portion nearer the center is agitated by the agitator 59, which may be moved up and down through the filter-bed to effectually agitate all portions thereof. The object of this arrangement is to provide for effectually agitating the central portion of the filter-bed. This is something which has not been accomplished satisfactorily by prior constructions, wherein a single agitator was provided for the entire filter-bed, as in the latter construction. In order to secure a sufficient movement at the center of the filter-bed to satisfactorily agitate it, it has been necessary to rotate the agitating device at such a high rate of speed that the outer agitators have acted so violently upon the outer portions of the filter-bed as to cause a great portion of the sand to be carried off with the wash-water and to seriously disarrange the level of the sand in the tank. By my construction, however, the different portions of the filter-bed may be agitated to substantially the same extent, so that there is no danger of carrying the sand out of the tank or of disturbing its level, except while the operation of washing is being conducted.

63 indicates a pipe for draining the chamber 8.

While I have described my improved construction in detail, I do not wish to be limited to the specific devices shown, except in so far as they are specifically claimed, as various modifications may be made without departing from my invention.

That which I claim as my invention, and desire to secure by Letters Patent, is—

1. In a filter, the combination of a filter-tank, a filtered-water chamber below said tank and communicating therewith, an external chamber around the upper part of said tank and communicating therewith, the lowermost portion of said external chamber being above said filtered-water chamber, and means for supplying unfiltered water to said external chamber, substantially as described.

2. In a filter, the combination of a filter-tank, a bottom therefor, a false bottom above said bottom and forming therewith a filtered-water chamber, strainers in said false bottom, a jacket around the upper portion of said filter-tank forming therewith an external chamber, the lowermost portion of said jacket being above said false bottom, and means for supplying unfiltered water to the filter-tank, substantially as described.

3. In a filter, the combination of a filter-tank, and a conduit extending around said tank and having a plurality of openings at separate points for supplying water to said tank, substantially as described.

4. In a filter, the combination of a filter-tank, a conduit extending around said tank and having a plurality of openings at separate points for supplying water to said tank, and a water-supply pipe connected with said conduit, the openings in said conduit farthest from the water-inlet being arranged to provide a greater area for the passage of water from said conduit to said tank than those nearer said inlet, substantially as described.

5. In a filter, the combination of a filter-tank, and a conduit extending around said tank and having a plurality of openings at separate points for supplying water to said tank, said openings being arranged to provide a gradually-increasing area for the passage of water to said tank, substantially as described.

6. In a filter, the combination of a filter-tank, a granular filter-bed therein, a system of strainers covering the bottom of said filter-tank, an external chamber around said tank and communicating therewith above the filter-bed and around the outer margin thereof, and means for supplying water to said external chamber at a plurality of points around the filter-tank, substantially as described.

7. In a filter, the combination of a filter-tank, a granular filter-bed therein, a system of strainers covering the bottom of said filter-tank, an external chamber around said tank and communicating therewith above the filter-bed and around the outer margin thereof, and means for supplying water to said external chamber in substantially-equal volume at a plurality of points around said filter-tank, substantially as described.

8. In a filter, the combination of a filter-tank, an external chamber around said tank and communicating therewith above the filter-bed, means for supplying water to said external chamber, and means for imparting a circulatory movement to the water in said chamber, substantially as described.

9. In a filter, the combination of a filter-tank, a conduit extending around said tank and having a plurality of openings at separate points for supplying water to said tank, and means for discharging water from said conduit tangentially, substantially as described.

10. In a filter, the combination of a filter-tank, an external chamber around said tank and communicating therewith above the filter-bed, a conduit below said external chamber and communicating therewith, and means for supplying water to said external chamber through said conduit, substantially as described.

11. In a filter, the combination of a filter-tank adapted to contain a granular filter-bed, means for admitting water to said tank above the filter-bed, and agitating devices for agitating the outer portion of the filter material, said outer agitating devices being rotatable about the center of the tank and other agitating means for agitating the central portion of the filter-bed, substantially as described.

12. In a filter, the combination of a filter-tank adapted to contain a granular filter-bed, means for admitting water to the filter-tank above the filter-bed, means for conducting filtered water from said filter-tank below the filter-bed, means for reversing the flow of water through said filter-bed, independently-operable agitating devices adapted to agitate the outer and inner portions of the filter-bed respectively, said outer agitating devices being rotatable about the center of the tank, and means for operating said agitating devices independently of each other, substantially as described.

13. In a filter, the combination of a filter-tank adapted to contain a granular filter-bed, means for admitting water to the filter-tank above the filter-bed, means for conducting filtered water from said filter-tank below the filter-bed, means for reversing the flow of water through said filter-bed, independently-operable agitating devices adapted to agitate the outer and inner portions of the filter-bed respectively, and means for operating said agitating devices independently of each other, the inner agitating device being vertically adjustable, substantially as described.

14. In a filter, the combination of a filter-tank, an annular track, agitating devices supported upon said track and adapted to rotate thereon, an independently-mounted agitating device, and means for rotating said agitating devices, substantially as described.

15. In a filter, the combination of a filter-tank, an annular track, agitating devices supported on said track and adapted to rotate thereon, means for rotating said agitating devices, and an independently-operable agitating device at the center of said tank, substantially as described.

16. In a filter, the combination of a filter-tank, an annular track, agitating devices supported on said track and adapted to rotate thereon, means for rotating said agitating devices, and an independently-operable agitating device at the center of said tank, said central agitating device being vertically adjustable, substantially as described.

OMAR H. JEWELL.

Witnesses:
WM. M. JEWELL,
JOHN L. JACKSON.